United States Patent [19]

Brouke et al.

[11] Patent Number: 5,913,988
[45] Date of Patent: Jun. 22, 1999

[54] OUT OF GAUGE RESISTANT RAILROAD WHEEL

[75] Inventors: Jacques Brouke, Coudekerque Branche; Francois Demilly, Dunkerque; Bernard Catot, Leffrinckoucke; Gervais Gaborit, Bois Le Roi, all of France

[73] Assignee: Valdunes, Puteaux, France

[21] Appl. No.: 09/010,109

[22] Filed: Jan. 21, 1998

Related U.S. Application Data

[63] Continuation of application No. 08/829,285, Mar. 31, 1997.

[30] Foreign Application Priority Data

Mar. 29, 1996 [FR] France ................................ 96 03942

[51] Int. Cl.$^6$ ...................................................... C22C 38/04
[52] U.S. Cl. ............................................. 148/320; 148/583
[58] Field of Search ...................................... 148/320, 583

[56] References Cited

U.S. PATENT DOCUMENTS

| | | |
|---|---|---|
| 2,103,834 | 12/1937 | Tyson . |
| 3,038,755 | 6/1962 | Keysor . |
| 3,753,789 | 8/1973 | Kucera et al. ........................... 148/583 |

FOREIGN PATENT DOCUMENTS

| | | | |
|---|---|---|---|
| 1497242 | 7/1989 | Russian Federation | ............... 148/583 |
| 511649 | 8/1939 | United Kingdom | ................... 148/583 |

*Primary Examiner*—Deborah Yee
*Attorney, Agent, or Firm*—Oblon, Spivak, McClelland, Maier & Neustadt, P.C.

[57] ABSTRACT

A railroad wheel revolving around an XX' axle perpendicular to a median plane P, of the type that includes a rim with a rolling surface and a flange, a hub, a plate a connecting area of the plate with the rim, a connecting area of the plate with the hub and with the plate section constructed along a meridian line AB extending between a point A located at the junction of the plate and the connecting area of the plate with the rim and a point B located at the junction of the plate and the connecting area of the plate with the hub, and characterized by the fact that the two points A and B are located on either side of the median plane P and are symmetrical to one another in relation to the intersection point I of the meridian line AB and the plane P, with point I an inflection point for the curve AB.

26 Claims, 1 Drawing Sheet

OUT OF GAUGE RESISTANT RAILROAD WHEEL

This application is a Continuation of application Ser. No. 08/829,285, filed on Mar. 31, 1997.

BACKGROUND OF THE INVENTION

1. Field of the Invention

This invention relates to a railroad wheel that exhibits little or no deformation, buckling, or distortion so as to cause the wheel to become out of gauge when a brake shoe is applied thereto, even if the wheel is used to support a heavily loaded car. Furthermore, the invention relates to a wheel adapted to be safely used in a high speed passenger train, and especially a wheel for a high speed tilt-type train that travels at speeds of up to 240 km/h and greater, such as has been proposed for use on Amtrak's Northeast corridor.

2. Discussion of the Background

Conventional railroad wheels include a rim (or tread), a hub, and a plate (a term used in the United States, but described as a "web" in the United Kingdom) that connects the hub and the rim. To lighten the wheels, a process that necessitates minimizing the stresses generated in the wheels, especially stresses resulting from overheating caused by the braking action of a brake shoe rubbing on the wheel, a curvilinear shape with an inflection point near the rim is given to a meridian line of the plate. This is especially the case for the railroad wheel described in French patent application FR 2,687,098.

Stress and creep generated in the wheel by braking actions causes the plate to deform, and become out of gauge, which modifies an axial position of the rim in relation to the hub so that the back-to-back distance between the two wheels on the same axle is either increased or reduced, depending on the geometry of the wheels. When the out of gauge condition decreases the spacing of the rims, track equipment crossing, such as shunting, is made difficult, and can lead to derailments if the wheel is too significantly out of gauge. Therefore, it is preferable to choose a wheel geometry that is aimed at separating the rims when the wheels become out of gauge. However, with this later wheel type, the wheel deformation tends to make the flanges on the wheels grind on the edges of the rails and cause additional wear.

In both wheel types, to avoid the problems generated by the wheels being out of gauge, restricting a weight load per axle during running of the wheels limits overheating of the wheels. Limiting the loads is particularly employed on railroad lines having a layout that requires long braking actions. This is the case, for example, of train lines that go through passes in mountainous regions.

Hot buckling during braking periods is distinguished from residual buckling which occurs after the wheels have cooled and results in the wheels becoming permanently out of gauge as a consequence of overheating the wheels. Residual buckling also depends on a geometry of the wheel, and thus a wheel geometry should be chosen, as determined by the present inventors, that minimizes residual buckling.

A wheel described in patent application FR 2 687 098 has low residual buckling because of its design. But, as determined by the present inventors, this wheel has, nevertheless, like all lightened wheels, a sensitivity to becoming out of gauge that considerably limits the operating conditions under which it can be used. These limitations make this wheel unsuitable for use on heavily loaded freight cars, particularly on mountainous routes.

In addition, consecutive overheating actions generate relatively significant residual tractive stresses in the wheel. Consequently, cumulative tractive stress on these wheels limits their service life and would create a safety hazard if used too long.

The out of gauge problem and, more generally, that of geometric stability in the service life also exists for high speed passenger trains, particularly for wheels intended for tilt-type trains. In fact, these trains that travel at speeds approaching, and even exceeding, 240 km/h, on the one hand, travel on tracks with signaling for two-way working; that is to say, the layout of these tracks is not specifically configured to support high speed travel; on the other hand they are equipped with a mixed braking system employing disks installed on the axles and shoes. Because of these operating conditions, it is preferable, as determined by the present inventors, for the wheels to have a plate, with a curved meridian line, to give them enough radial and axial elasticity so that they will experience the least possible deformation under the effect of successive braking actions or under the effect of very significant braking actions, in particular, during emergency stops. These conditions are necessary to provide train safety. This elasticity and this dimensional stability, however, are not adequate, as determined by the present inventors, for this type of train. In fact, stresses to which the wheels are subject, can generate catastrophic fatigue failures, failures that must be avoided at all cost, since they are very dangerous, and pose a danger to human life when the train is traveling fast.

SUMMARY OF THE INVENTION

Accordingly, one object of this invention is to provide a novel railroad wheel that corrects for the above-identified disadvantages with conventional railroad wheels.

Another object of the present invention is to provide a lightened railroad wheel that is resistant to becoming out of gauge and exhibits a low sensitivity to both hot buckling and residual buckling, as well as exhibiting noticeably reduced residual tractive stresses as compared with conventional wheels.

A further object of the present invention is to provide a wheel having a shape and composition consistent with that required to be used with high speed tilt-type passenger trains, such as has been proposed on Amtrak's Northeast corridor.

These and other objects may be accomplished with a railroad wheel that revolves around an axle XX' perpendicular to a median plane P. The wheel includes a rim with a rolling surface and a flange, a hub, a plate, a connecting area of the plate with the rim, and a connecting area of the plate with the hub. A structural feature of the wheel is that the plate section is constructed along a meridian curved line AB, having a generally serpentine (or S-like) shape, that extends between a point A located at the junction of the plate and the connecting area of the plate with the rim, and a point B located at the junction of the plate and the connecting area of the plate with the hub. Furthermore, the two points A and B are located on either side of the median plane P and are symmetrical to one another in relation to an intersection point I of the meridian curved line AB and the plane P, where the point I defines an inflection point for the meridian curved line AB.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
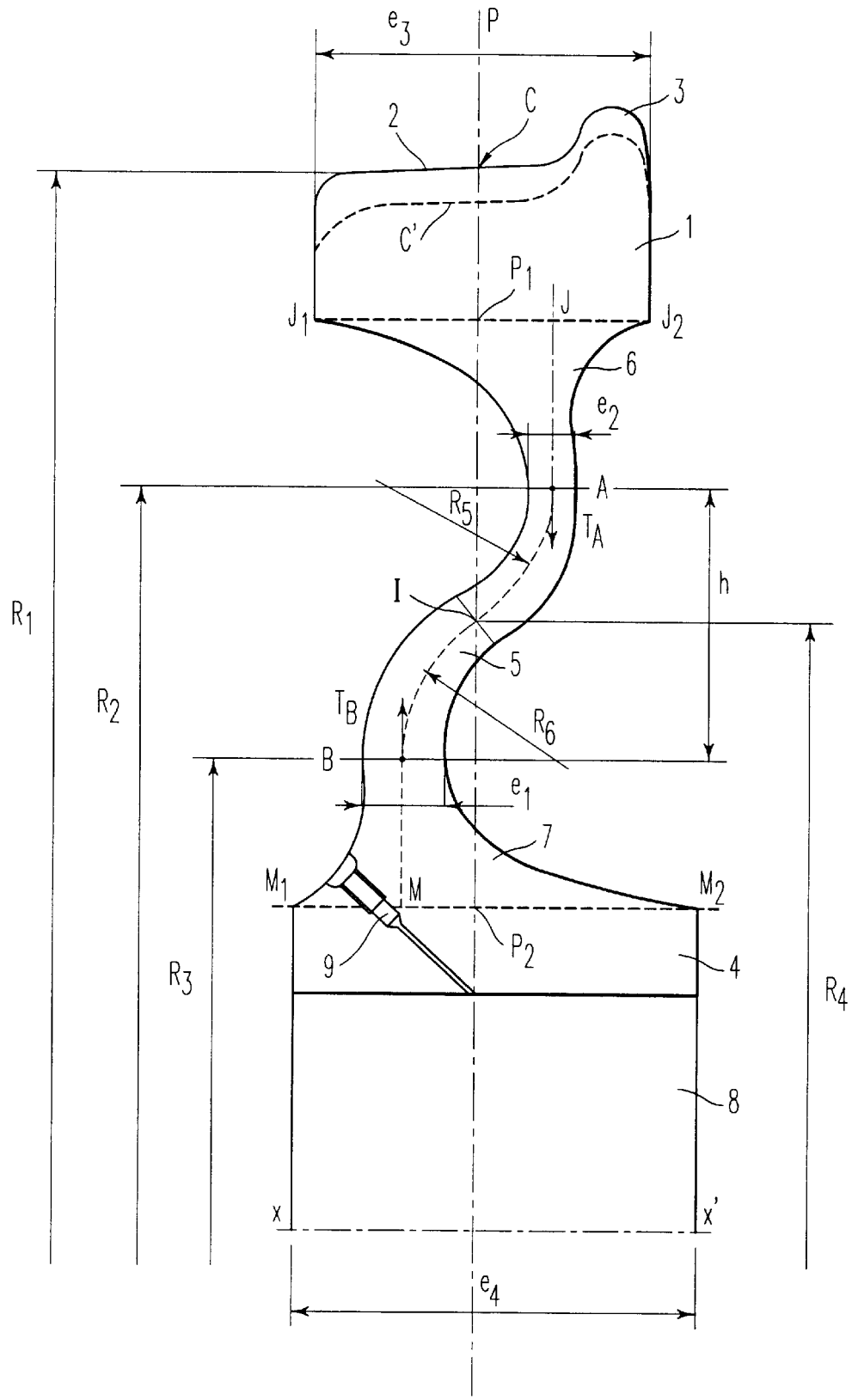
FIG. 1 is a half cross-sectional view of a railroad wheel according to the present invention.

Referring now to FIG. 1, there is illustrated a partial (one-half) cross-section of a railroad wheel that revolves about an axle XX', which is perpendicular to a median plane P.

Features and characteristics of this wheel will be first be described in an overview fashion, and will subsequently be described in greater detail.

Overview

The wheel includes a rim 1 with a rolling surface 2 and a flange 3, a hub 4, a plate 5, a first connecting area 6 that connects the plate 5 with the rim 1, and a second connecting area 7 that connects the plate 5 with the hub 4. The plate 5 is constructed along a curved meridian line AB, having a generally serpentine shape (or an S-like shape) as shown in FIG. 1. The curved meridian line extends between a point A located at a junction of the plate 5 and the first connecting area 6 and a point B located at a junction between the plate 5, and the second connecting area 7. The two points A and B are located on either side of the median plane P and are symmetrically spaced about an intersection point I of the meridian line AB and the median plane P, where the intersection point I is an inflection point for the curved meridian line AB.

A distance of intersection point I from the axle XX' is between 0.5 and 0.65 times the outer radius of the wheel. It is also preferable for a tangent $T_A$ of the curved line AB at point A and $T_B$ of the curved line AB at point B to be parallel to the median plane P, as shown in FIG. 1.

As observed by the present inventors, an affect of hot buckling on the stability of the wheels on the track is minimal when the point A is located on a same side of Plane P as the flange 3.

To lighten the wheel to a maximum extent possible, while maintaining the other desirable properties of the present invention, it is preferable that, along the curved line AB, the thickness of the plate 5 decrease evenly, or monotonicly, from the point B up to the point A, and that, for example, this decrease be linear. The ratio of the thickness at the point A to the thickness at the point B is preferably between 0.5 and 0.55.

Finally, it is desirable for the wheel to be centered with a distance from the plane P to an outer side of the flange 3 to be between about 70 and 85 mm.

When the wheel is intended for a high speed tilt-type train that can travel at high speeds of 240 km/h, and higher, it is preferable that the wheel be made of steel with a chemical composition that includes, by weight:

$0.470\% \leq C \leq 0.570\%$
$0.600\% \leq Mn \leq 0.850\%$
$0.150\% \leq Si \leq 0.400\%$
$S \leq 0.010\%$
$P \leq 0.020\%$
$Ni \leq 0.300\%$
$Cr \leq 0.300\%$
$Mo \leq 0.080\%$
$Cu \leq 0.300\%$
$V \leq 0.050\%$
$Al \leq 0.025\%$
$Ti \leq 0.070\%$
$H \leq 0.0002\%$
$O \leq 0.0015\%$
$N \leq 0.0080\%$ with the remainder, being iron and impurities resulting from development. In addition an inclusion purity, controlled by comparison to standard images according to the ASTM E45 standard, should be such that the A, B, C, D quotations are less that the following maximum values, as set forth below:

| Serial maximum (types of inclusions) | A sulfates | B aluminates | C silicates | D oxides |
| --- | --- | --- | --- | --- |
| Thin | 1.5 | 1.5 | 1.5 | 1.5 |
| Thick | 1.5 | 1 | 1 | 1.5 | where the sum of values of B+C+D is less than or equal to 3. Furthermore, the ASTM grain size index should be set larger than or equal to 7, at the maximum, where 20% of the grains have an ASTM index equal to 6.

Another feature of the present railroad wheel is a characteristic hardness on a lateral side of the rim 1 being set between 255 and 321 BH (Brinell Hardness) and a remaining portion being above 255 BH for at least up to 35 mm below the rolling surface of the rim 1.

Traction and resilience characteristics according to the present wheel embodiment are as set forth as follows

| | Rim | Plate |
| --- | --- | --- |
| Rm (Tensile Strength) | 820/940 MPa | δRm/rim* ≧ 110 MPa |
| Re (Yield Strength) | ≧550 MPa | ≧420 MPa |
| A % | ≧14% | ≧16% |
| Impact Test Ku at 20° C. | ≧17 J** | |
| Impact Test Kv at −30° C. | ≧10 J** | |

*rim-Rm-plate Rm distance
**average of 3 tests

Another feature of the present wheel is that ultrasound and/or magnetic particle inspection of an entire wear range of the rolling width is set in accordance with a specification AAR M107, section 18.

These conditions make it possible to avoid, in particular, rim breakdowns by cracking during operation.

Description in Greater Detail

An exemplary embodiment of the present invention will now be described in greater detail.

Since the general guiding principle of a wheel's geometric construction is the same regardless if it is a regular railroad car wheel or a high speed train wheel, a general discussion directed to the general principle of the wheel, without reference to its use, is in order before directing attention to features of a wheel adapted for use with a high speed tilt-type train.

The railroad wheel of FIG. 1 is shown as a half meridian section of a part revolved around an axle XX' that is perpendicular to a plane P. The wheel includes on its perimeter a rim 1, the middle thickness of which is in the plane P. The rim 1 includes a rolling surface 2 and a flange 3. In its axis, the wheel includes a hub 4 with an axial bore 8 intended for receiving an axis shaft. A plate 5 connects the hub 4 and the rim 1 through a connecting area of the plate 5 with the rim 1 (namely, a first connecting area 6) and a connecting area of the plate 5 with the hub 4 (namely, a second connecting area 7).

As shown, the cross-section of the plate 5 is constructed along a curved meridian line AB, having a generally serpentine (or S-like) shape, extending between a point A located at the junction of the plate 5 and the first connecting area 6, and a point B located at the junction of the plate 5 and the second connecting area 7. The two points A and B are located on either side of the median plane P and are symmetrical to one another in relation to an intersection point I of the curved meridian line AB and the plane P. The intersection point I is an inflection point for the curved meridian line AB. Curved sections AI and IB are noticeably arcs of a circle, with respective radiuses R5 and R6 that are larger than half a radial distance h (distance measured parallel to plane P) between the point A and the point B, as shown in FIG. 1. More generally, the curved sections AI and IB are symmetrically arranged about the intersection point I.

The distance from the intersection point I to the axle XX' is set to be between 0.5 and 0.65 times the outer radius, R1, of the wheel, with this radius R1, being a distance from the intersection point C of plane P with the rolling surface 2 to the axle XX' when the wheel is new, and the distance from point C' to the axle XX' when the wheel is worn. In other words, R1 decreases in length as the wheel wears down. Typical outer radiuses of wheels are 18" and 20".

A tangent $T_A$ to the curve AB at the point A dissects a trace $J_1J_2$ of a boundary between the plate 5 and the rim 1 at a point J, as shown. Also, a tangent $T_B$ to the curve AB at the point B dissects a trace $M_1M_2$ of a boundary between the plate 5 and the hub 4 at a point M, as shown. The trace $J_1J_2$ dissects the trace of plane P at a point $P_1$, and the trace $M_1M_2$ dissects the trace of the plane P at a point $P_2$. The distances $P_1J$ and $P_2M$ are noticeably equal, that is to say, equal near factory (manufacturing) limits. Thus, the tangents $T_A$ and $T_B$ are parallel to the plane P, near factory limits.

In FIG. 1, shows a preferred wheel configuration where the point A is located on the same side of the plane P as the flange 3. Clearly, the flange 3 could also be located on the other side of the plane P.

Along the curved line AB, a thickness "e" of the plate 5 decreases evenly, monotonicly, and noticeably linearly from the point B to the point A. Thus, the more narrow portion of the plate 5 is nearer the rim 1 than the hub 4.

Finally the railroad wheel is centered, meaning that the plane P is both at a mid-thickness of the rim 1 and at a mid-thickness of the hub 4.

According to the symmetric arrangement of the points A and B, in relation to the point I, and by virtue of the point I being an inflection point of the curve AB, the wheel exhibits limited deformation so as to stay within gauge, even when stressed. With this structure, the overheating generated by braking tends to strain the curved line AB in a direction parallel to the plane P. As observed by the present inventors, the amount of deformation is proportionately more limited when the inflection point I is located in the vicinity of a mid-radius of the wheel. It is also limited when the tangents $T_A$ and $T_B$ are noticeably parallel to the plane P.

Note that the curve AB does not necessarily consist of two circular arc segments. Rather, for example, a third curved section may be added as well. Furthermore, Point A does not have to be on the same side of plane P as the flange; however, this layout is preferred because possible deformation tends to increase the width of the wheels, which favors good stability on the track.

Alternatively, the wheel need not be centered. However, a centered wheel is preferred because centering makes it possible to limit rotative bending stresses in the axle shafts.

Finally, a progressive variation in thickness of the plate 5 makes it possible to lighten the wheel to a maximum amount while preserving the other desirable features of the present wheels. This progressive variation feature is particularly beneficial when the plate 5 is made of a forge cast material. Lightening is made possible, in particular, because the most significant dynamic axial stresses that the plate 5 has to sustain are in the vicinity of the hub 4. It is therefore not necessary for the thickness of the plate 5 in the vicinity of the rim 1 to be as significant as in the vicinity of the hub 4.

It should be noted that a railroad wheel may be a forged part (e.g., such as formed by a forging process including a milling process) or a cast part (e.g., such as formed by a casting process), that is to say, a part with a certain geometric imprecision; thus the characteristics that have just been described are only "appreciably" realized, that is to say, within a few mm.

The wheel constructed in this way is especially adaptable to railroad cars. For example, the wheel may be used with a railroad car having a load per axle of 25 tons and exert a braking power per wheel that can reach 40 kW for 30 minutes.

When adapted for use in high speed tilt-type trains that can travel at speeds of 240 km/hour and greater, it is preferable for the wheel to include a symmetry plane P passing through the mid-thickness of rim 1. However, the wheel will not be quite centered because the hub 4 is a little off from the side of flange 3. In this configuration the plate 5 is constructed around a meridian line AB with the inflection point I located in the plane P. The outer radius $R_1$ of the this wheel is 457.2 mm, points A and B are located on the circles with respective radii $R_2$=316.2 mm and $R_3$=204.6 mm so that point I is located on a circle with a radius $R_4$=260.4 mm. The $R_4/R_1$ ratio is 0.57. The radial distance h between points A and B is 111.6 mm. The segments AI and IB of the meridian line AB are arcs of a circle with respective radii $R_5$=65 mm and $R_6$=65 mm, both of which are longer than half the radial distance h.

As shown in FIG. 1, a thickness of the plate 5 is $e_1 = 32$ mm of the side of the hub 4, and decreases evenly to $e_2 = 19.05$ mm of the side of the rim 1, where the decrease is monotonic and approximately linear.

The tangents $T_A$ and $T_B$ are parallel to plane P at the points A and B. The intersection point J of the tangent $T_A$ with the line $J_1J_2$, tracing the boundary between the plate 5 and the rim 1, is located beside flange 3 at a distance of 32.2 mm from the plane P. The intersection point M of the tangent $T_B$ with the line $M_1M_2$, tracing the boundary between the plate 5 and the hub 4, is located on the opposite side of flange 3 at a distance of 27.8 mm from the plane P. The thickness $e_3$ of the rim is 136.5 mm; the hub has a thickness $e_4 = 169.1$ mm. The plane P is located at an axial distance of 69.9 mm from the side of the hub 4 located on the opposite side of the flange 3. The lateral surface of the rim 1 on the flange side is recessed by 22.225 mm in relation to the lateral surface of the hub 4 located near the flange 3. In addition, the wheel includes an oil injection hole 9 which emerges in the bore 8 of the hub 4 and which is meant for injecting oil under pressure to facilitate overhauling the wheel when the latter is installed on an axle.

The wheel designed in this way has good axial and radial elasticity and good resistance to braking actions: deformation and the risk of becoming out of gauge is low, and the residual stresses in the areas of connection between the rim 1 and the hub 4 remain compressive stresses.

The exact wheel dimensions that have just been given above are optimized for a particular application. These dimensions can be modified as needed by one of ordinary skill in the railroad car wheel art, in light of the present teachings, to adapt the wheel to slightly different usage conditions.

These wheels can be made completely of steel by the standards relative to steel for railroad wheels, in particular by the Unites States specification AAR M-107 of Jan. 1, 1994, the contents of which are incorporated herein by reference. However, the present inventors have noted that with respect to the characteristics imposed by these standards, the standards were not adequate to avoid catastrophic breakdowns in service when the wheels were installed and used on high speed trains. The inventors have noted, on the other hand, that to provide for adequate safety in operating a tilt-type train at a speed that might reach or exceed 240 km/h on a track that has signaling for two way running, the wheel should be forged to obtain adequate compactness and should be made of a steel with the following characteristics:

a) chemical composition in % by weight $0.470\% \leq C \leq 0.570\%$
$0.600\% \leq Mn \leq 0.850\%$
$0.150\% \leq Si \leq 0.400\%$
$S \leq 0.010\%$
$P \leq 0.020\%$
$Ni \leq 0.300\%$
$Cr \leq 0.300\%$
$Mo \leq 0.080\%$
$Cu \leq 0.300\%$
$V \leq 0.050\%$
$Al \leq 0.025\%$
$Ti \leq 0.070\%$
$H \leq 0.0002\%$
$O \leq 0.0015\%$
$N \leq 0.0080\%$ with the remainder being iron and impurities resulting from development;

b) The inclusion purity

The inclusion purity should be controlled by comparison to standard images according to the AST E45 standard; the observed quotation values should remain lower than the following standard maximum values:

| Serial Maximum (inclusion type) | A sulfates | B aluminates | C silicates | D oxides |
|---|---|---|---|---|
| Thin | 1.5 | 1.5 | 1.5 | 1.5 |
| Thick | 1.5 | 1 | 1 | 1.5 | in addition, the sum of the values of B+C+D must remain lower than or equal to 3;

c) grain size

The grain must be fine and with an ASTM index higher than or equal to 7; at the most, 20% of the grains with an ASTM index equal to 6 can be accepted;

d) mechanical characteristics

The hardness must be between 255 and 321 BH on the lateral side of the rim and remain above 255 BH at least up to 35 mm below the rolling surface.

The traction and resilience characteristics should be the following:

| | Rim | Plate |
|---|---|---|
| Rm (Tensile Strength) | 820/940 MPa | $\delta$Rm/rim* $\geq$ 110 MPa |
| Re (Yield Strength) | $\geq$550 MPa | $\geq$420 MPa |
| A % | $\geq$14% | $\geq$16% |
| Impact Test Ku at 20° C. | $\geq$17 J** | |
| Impact Test Kv at −30° C. | $\geq$10 J** | |

*rim Rm-plate Rm distance
**average of 3 tests, e) Controls

Ultrasound and/or magnetic particle inspection control of the entire wear range of the rolling width should comply with specification AAR M107, section 18.

The chemical composition was selected to obtain a ferrite-perlite structure with the desired mechanical characteristics by hardening the rim 1. The rim's mechanical characteristics and hardness make it possible to limit chipping and deformations of the rolling surface. In particular, the elasticity limit is chosen to obtain adequate resistance to shearing stress under the rolling surface and thus to avoid deformations of the latter which generate losses of stability in the vehicle equipped with the wheel. The mechanical characteristics of the plate 5 make it possible to design a light wheel that is very resistant to dynamic stresses in use. The difference in resistance to the traction Rm between the rim 1 and plate 5 makes it possible to obtain residual tractive stresses in the connection area between the plate 5 and the rim 1. The combination of the mechanical characteristics of the rim, in particular, resilience, inclusion purity, and the ultrasound control results, make it possible to avoid loss of rim sectors by cracking during use since this type of incident is very dangerous.

A minimum carbon content is established to make it possible to obtain a hardness sufficient to limit wear of the wheel by rolling. A maximum content is established to limit wear of the wheel generated by shoe-braking that causes very significant surface overheating that can lead to the formation of martensite bobs that grow proportionately more fragile as the carbon content is higher. In addition, it is preferable to limit the carbon content to obtain a hardness of the rolling surface not much higher than that of the rails in order to limit wear of the latter.

For certain wheels that are braked only by disks, such as locomotive wheels that work under conditions that are a little different from those of car wheels, a slightly higher carbon content between 0.57% and 0.670% can be selected. The hardness should then be between 277 and 341 BH on the lateral side of the rim and remain above 277 BH at least up to 35 mm below the rolling surface that corresponds to the last configuration.

The traction and resilience characteristics should be as follows:

|  | Rim | Plate |
| --- | --- | --- |
| Rm (Tensile Strength) | 920/1150 MPa | δRm/rim* ≧ 110 MPa |
| Re (Yield Strength) | ≧680 MPa | ≧450 MPa |
| A % | ≧12% | ≧14% |
| Impact Test Ku at 20° C. Impact Test Kv at −30° C. | ≧10 J** | ≧6 J** |

*rim Rm-plate Rm distance
**average of 3 tests

All the other characteristics, in particular, purity, and the ultrasound control results should be identical to those that were defined in the preceding case.

It can be noted that when the wheel is not completely braked by shoes, the wheel plate can be straight, but the mechanical and purity characteristics especially should be respected to avoid breaks in service.

EXAMPLES

By way of example and comparison, wheels for a tilt-type train that could travel at high speeds, 240 km/h and higher, were manufactured with the following characteristics:

1) series no. 1 according to the present invention

A wheel for a car with an curved plate, with a generally serpentine (or S-like) shape, such as that described above, was configured for mixed braking, 85% by disks, and 15% by shoes.

Chemical composition of the metal (in $10^{-3}$% by weight)

| C | Mn | Si | S | P | Cr | Ni | Mo | Cu | Al | V | Ti | H | O | N |
| --- | --- | --- | --- | --- | --- | --- | --- | --- | --- | --- | --- | --- | --- | --- |
| 485 | 810 | 395 | 4 | 11 | 245 | 195 | 30 | 143 | 20 | — | — | 0.15 | 1.1 | 7 |

Mechanical characteristics:

|  | Rim | Plate |
| --- | --- | --- |
| Rm (Tensile Strength) | 925 MPa | 710 MPa |
| Re (Yield Strength) | 638 MPa | 482 MPa |
| A % | 17% | 18% |
| Impact Test Ku at 20° C. | 18/20/19 J* |  |
| hardness | 295 BH |  |

*three values

Inclusion purity:

| types of inclusions | A sulfates | B aluminates | C silicates | D oxides |
| --- | --- | --- | --- | --- |
| fine | 0.5 | 0 | 0 | 0.5 |

Ultrasound controls

No defects equivalent to holes 2 mm in diameter.

Grain structure and size

Ferrite-perlite, ASTM 8 grain size.

2) series no. 2, according to the present invention

A wheel configured for used in a locomotive with a straight plate, and 100% disk braking including the following characteristics.

Chemical composition of the metal (in $10^{-3}$% by weight)

| C | Mn | Si | S | P | Cr | Ni | Mo | Cu | Al | V | Ti | H | O | N |
|---|----|----|---|---|----|----|----|----|----|----|----|---|---|---|
| 616 | 795 | 380 | 4 | 13 | 210 | 232 | 38 | 143 | 20 | — | — | 0.18 | 1.4 | 7 |

Mechanical characteristics:

|  | Rim | Plate |
|---|---|---|
| Rm (Tensile Strength) | 1134 MPa | 917 MPa |
| Re (Yield Strength) | 782 MPa | 623 MPa |
| A % | 15% | 16% |
| Impact Test Ku at 20° C. | 14/10/12 J* |  |
| hardness | 330 BH |  |

*three values

Inclusion purity:

| types of inclusions | A sulfates | B aluminates | C silicates | D oxides |
|---|---|---|---|---|
| fine | 0.5 | 0 | 0 | 0.5 |

Ultrasound controls
No defects equivalent to holes 2 mm in diameter.
Grain structure and size
ferrite-perlite, ASTM 8 grain 3) series no. 3, by way of comparison A car wheel having a straight plate, mixed braking, 85% by disks, 15% by shoes, included the following characteristics.

Chemical composition of the metal (by $10^{-3}$ by weight):

| C | Mn | Si | S | P | Cr | Ni | Mo | Cu | Al | V | Ti | H | O | N |
|---|----|----|---|---|----|----|----|----|----|----|----|---|---|---|
| 625 | 720 | 185 | 21 | 11 | 105 | 100 | 25 | 215 | 9 | — | — | 0.2 | 2 | 7 |

Mechanical characteristics:

|  | Rim | Plate |
|---|---|---|
| Rm (Tensile Strength) | 992 MPa | 782 MPa |
| Re (Yield Strength) | 630 MPa | 394 MPa |
| A % | 14% | 16% |
| Impact Test Ku at 20° C. | 7/10/6.5 J* |  |
| hardness | 300 BH |  |

*three values

Inclusion purity:

| types of inclusions | A sulfates | B aluminates | C silicates | D oxides |
|---|---|---|---|---|
| thick | 1.5 | 3.5 | 0 | 0.5 |

Ultrasound controls

No defects equivalent to holes 3 mm in diameter.

Grain structure and size ferrite-perlite, ASTM 6 grain size

The operating results of these series of wheels were as follows:

| Series | No. 1 | No. 2 | No. 3 |
|---|---|---|---|
| Deformation (Amount out of gauge) | low | No object | high |
| Shelling/Spalling | low | low | average |
| Rolling surface | low | low | average |

-continued

| Series | No. 1 | No. 2 | No. 3 |
|---|---|---|---|
| wear Rolling deformation | low | very low | average |
| Rim breaking due to internal cracks (loss of sectors) | no | no | no |

These results reveal, that the curved shaped plate according to the invention considerably reduces an amount by which the wheel is out of gauge (comparison A and C). Furthermore, the characteristics of the metal according to the present invention make it possible to avoid breaks in the rim by cracking, thus avoiding safety hazards when used in high speed applications such as with tilt-type trains.

In this application all given value ranges include all values, ranges and subranges between all given values.

This application is based on French application 96 03942 filed Mar. 29, 1996, the contents of which are incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An out of gauge resistant railroad wheel comprising:
   a rim;
   a hub configured to receive an axle;
   a plate disposed between the rim and the hub;
   a first connecting section that connects the plate to the rim; and
   a second connecting section that connects the plate to the hub, wherein at least one of the rim, the hub, the first connecting section, the plate, and the second connection section comprises steel with a chemical composition that includes by weight,
   $0.470\% \leq C \leq 0.570\%$
   $0.600\% \leq Mn \leq 0.850\%$
   $0.150\% \leq Si \leq 0.400\%$
   $S \leq 0.010\%$
   $P \leq 0.020\%$
   $Ni \leq 0.300\%$
   $Cr \leq 0.300\%$
   $Mo \leq 0.080\%$
   $Cu \leq 0.300\%$
   $V \leq 0.050\%$
   $Al \leq 0.025\%$
   $Ti \leq 0.070\%$
   $H \leq 0.0002\%$
   $O \leq 0.0015\%$
   $N \leq 0.0080\%$
   with a remainder of the chemical composition comprising iron and impurities, wherein said chemical composition comprises an inclusion purity, as compared to standard images according to an ASTM E45 standard, having a set of maximum A, B, C, and D quotation values that are lower than a set of maximum standard values, where the set of maximum standard values are defined as,

| Serial maximum (types of inclusions) | A sulfates | B aluminates | C silicates | D oxides |
|---|---|---|---|---|
| Thin | 1.5 | 1.5 | 1.5 | 1.5 |
| Thick | 1.5 | 1 | 1 | 1.5 | with a sum of maximum standard values B+C+D being lower than or equal to 3.

2. The railroad wheel of claim 1, wherein said steel comprises grains having a minimum fine size of 7, as measured on an ASTM grain size index, and not more than 20% of said grains being of size 6.

3. The railroad wheel of claim 1, wherein:
   said rim comprises said steel.

4. The railroad wheel of claim 3, wherein:
   said steel having a hardness in an inclusive range of 255 BH to 321 BH, and said hardness level being at or above 255 BH for up to and including 35 mm beneath a rolling surface of said rim.

5. The railroad wheel of claim 1, wherein:
   said hub comprises said steel.

6. The railroad wheel of claim 1, wherein:
   said first connecting section comprises said steel.

7. The railroad wheel of claim 1, wherein:
   said plate comprises said steel.

8. The railroad wheel of claim 1, wherein:
   said second connecting section comprises said steel.

9. The railroad wheel of claim 1, wherein said rim and said plate are configured to exhibit traction characteristics and resilience characteristics as follows,

|  | Rim | Plate |
|---|---|---|
| Rm (Tensile Strength) | 820/940 MPa | δRm/rim* $\geq 110$ MPa |
| Re (Yield Strength) | $\geq 550$ MPa | $\geq 420$ MPa |
| A % | $\geq 14\%$ | $\geq 16\%$ |
| Impact Test Ku at 20° C. | $\geq 17$ J** |  |
| Impact Test Kv at −30° C. | $\geq 10$ J** |  | where *rim-Rm-plate signifies Rm distance, and **signifies that results of 3 tests are averaged.

10. The railroad wheel of claim 1, wherein said rim comprises a wear range comprising said steel, said steel being free of defects equivalent to holes with a 2 mm or larger diameter when inspected by at least one of an ultrasonic measuring equipment and a magnetic particle measuring equipment in accordance with *the American Association of Railroads (AAR) standard* M107, section 18.

11. The railroad wheel of claim 1, wherein said wheel is formed by at least one of a casting process and a forging process.

12. The railroad wheel of claim 11, wherein said forging process comprises a milling process.

13. The railroad wheel of claim 1, wherein at least one of the rim, the hub, the first connecting section, the plate, and the second connection section consists of said steel.

14. An out of gauge resistant railroad wheel configured to be braked by a disk, comprising:
   a rim;
   a hub configured to receive an axle;
   a plate disposed between the rim and the hub;
   a first connecting section that connects the plate to the rim; and
   a second connecting section that connects the plate to the hub, wherein at least one of the rim, the hub, the first connecting section, the plate, and the second connection section comprises steel with a chemical composition that includes by weight,
   $0.570\% \leq C \leq 0.670\%$
   $0.600\% \leq Mn \leq 0.850\%$
   $0.150\% \leq Si \leq 0.400\%$
   $S \leq 0.010\%$
   $P \leq 0.020\%$
   $Ni \leq 0.300\%$
   $Cr \leq 0.300\%$ Mo≦0.080%
Cu≦0.300%
V≦0.050%
Al≦0.025%
Ti≦0.070%
H≦0.0002%
O≦0.0015%
N≦0.0080% with a remainder of the chemical composition comprising iron and impurities, wherein said chemical composition comprises an inclusion purity, as compared to standard images according to an ASTM E45 standard, having a set of maximum A, B, C, and D quotation values that are lower than a set of maximum standard values, where the set of maximum standard values are defined as,

| Serial maximum (types of inclusions) | A sulfates | B aluminates | C silicates | D oxides |
|---|---|---|---|---|
| Thin | 1.5 | 1.5 | 1.5 | 1.5 |
| Thick | 1.5 | 1 | 1 | 1.5 | with a sum of maximum standard values B+C+D being lower than or equal to 3.

15. The railroad wheel of claim 14, wherein said steel comprises grains having a minimum fine size of 7, as measured on an ASTM grain size index, and not more than 20% of said grains being of size 6.

16. The railroad wheel of claim 14, wherein:
said rim having a lateral side comprising said steel.

17. The railroad wheel of claim 16, wherein:
said steel on the lateral side of the rim having a hardness in an inclusive range of 277 BH to 341 BH, and said hardness level being at or above 277 BH for up to and including 35 mm beneath a rolling surface of said rim.

18. The railroad wheel of claim 14, wherein:
said hub comprises said steel.

19. The railroad wheel of claim 14, wherein:
said first connecting section comprises said steel.

20. The railroad wheel of claim 14, wherein:
said plate comprises said steel.

21. The railroad wheel of claim 14, wherein:
said second connecting section comprises said steel.

22. The railroad wheel of claim 14, wherein said rim and said plate are configured to exhibit traction characteristics and resilience characteristics as follows,

|  | Rim | Plate |
|---|---|---|
| Rm (Tensile Strength) | 920/1150 MPa | δRm/rim* ≧ 110 MPa |
| Re (Yield Strength) | ≧680 MPa | ≧450 MPa |
| A % | ≧12% | ≧14% |
| Impact Test Ku at 20° C. | ≧10 J** | |
| Impact Test Kv at −30° C. | ≧6 J** | | where *rim-Rm-plate signifies Rm distance, and **signifies

23. The railroad wheel of claim 14, wherein said rim comprises a wear range comprising said steel, said steel being free of defects equivalent to holes with a 2 mm or larger diameter when inspected by at least one of an ultrasonic measuring equipment and a magnetic particle measuring equipment in accordance with *the American Association of Railroads (AAR) standard* M107, section 18.

24. The railroad wheel of claim 14, wherein said wheel is formed by at least one of a casting process and a forging process.

25. The railroad wheel of claim 24, wherein said forging process comprises a milling process.

26. The railroad wheel of claim 14, wherein at least one of the rim, the hub, the first connecting section, the plate, and the second connection section consists of said steel.

* * * * *

UNITED STATES PATENT AND TRADEMARK OFFICE
CERTIFICATE OF CORRECTION

PATENT NO. : 5,913,988

DATED : June 22, 1999

INVENTOR(S): Jacques BROUCKE, et al.

It is certified that an error appears in the above-identified patent and that said Letters Patent is hereby corrected as shown below:

On the title page, item [75] the 1st inventor's name should be:

--Jacques Broucke--

On the title page, item [19] should be:

--Broucke et al.--

Signed and Sealed this

Twenty-seventh Day of June, 2000

Attest:

Q. TODD DICKINSON

*Attesting Officer*          *Director of Patents and Trademarks*